(12) United States Patent
Nauche

(10) Patent No.: US 8,083,572 B2
(45) Date of Patent: Dec. 27, 2011

(54) PAIR OF OPHTHALMIC EYEGLASSES AND A METHOD OF FORMING AN ENGAGEMENT PERIPHERAL RIDGE ON THE EDGE FACE OF A LENS

(75) Inventor: Michel Nauche, Charenton-le-Pont (FR)

(73) Assignee: Essilor International (Compagnie Generale d'Optique), Charenton-le-Pont (FR)

(*) Notice: Subject to any disclaimer, the term of this patent is extended or adjusted under 35 U.S.C. 154(b) by 353 days.

(21) Appl. No.: 12/376,203

(22) PCT Filed: Jul. 11, 2007

(86) PCT No.: PCT/FR2007/001190
§ 371 (c)(1),
(2), (4) Date: Feb. 3, 2009

(87) PCT Pub. No.: WO2008/015324
PCT Pub. Date: Feb. 7, 2008

(65) Prior Publication Data
US 2010/0002187 A1 Jan. 7, 2010

(30) Foreign Application Priority Data
Aug. 4, 2006 (FR) ...................................... 06/07145

(51) Int. Cl.
*B24B 1/00* (2006.01)
(52) U.S. Cl. ........................................... 451/43; 451/42
(58) Field of Classification Search .............. 451/5, 255, 451/323, 325, 11, 42, 43, 44; 351/41, 86
See application file for complete search history.

(56) References Cited

U.S. PATENT DOCUMENTS

| 2,284,262 | A | 5/1942 | Churchill |
| 3,894,361 | A | 7/1975 | Georgiadis et al. |
| 7,281,967 | B2 | 10/2007 | Meunier et al. |
| 7,540,798 | B2 * | 6/2009 | Shibata ............................ 451/5 |

FOREIGN PATENT DOCUMENTS

| DE | 29 24 480 | 1/1981 |
| EP | 0 894 568 | 2/1999 |
| FR | 2 763 269 | 11/1998 |
| FR | 2 852 878 | 10/2004 |
| GB | 509.954 | 7/1939 |
| WO | 01/70461 | 9/2001 |

OTHER PUBLICATIONS

International Search Report dated Nov. 19, 2007, from corresponding PCT application.

* cited by examiner

*Primary Examiner* — Hung Dang
(74) *Attorney, Agent, or Firm* — Young & Thompson

(57) ABSTRACT

A pair of eyeglasses includes: a frame provided with at least one rim presenting an internal bezel; and a lens mounted in the frame, the lens presenting a front face, a rear face, and on its edge face, an engagement peripheral ridge presenting a rear flank, situated beside the rear face of the lens and a front flank situated beside the front face of the lens, the front and rear flanks being engaged in the internal bezel. The front flank of the engagement peripheral ridge presents continuity of at least first order with the remainder of the front face. The edge face of the lens presents a rear shoulder or foot, and in that the radial height of the engagement peripheral ridge considered between the peak of the peripheral ridge and the foot varies along the periphery of the lens.

16 Claims, 4 Drawing Sheets

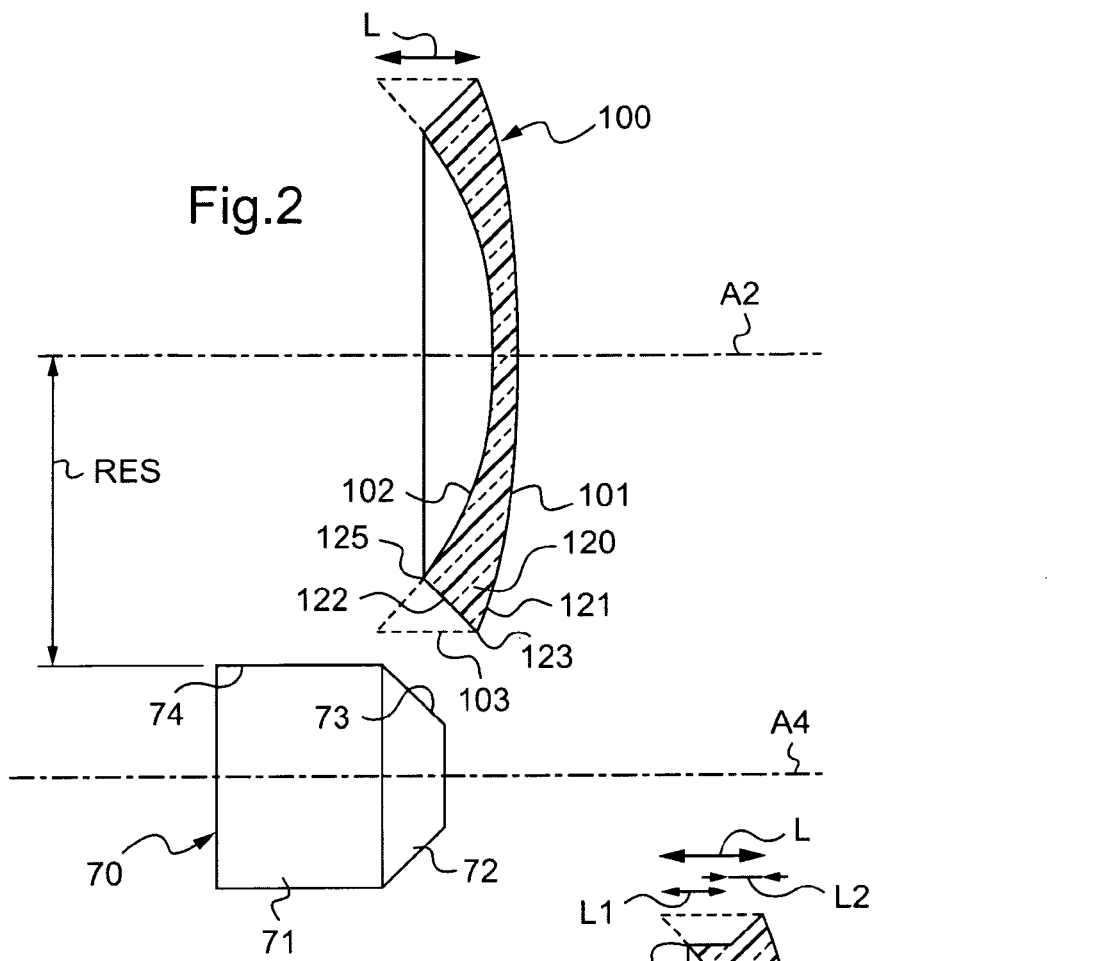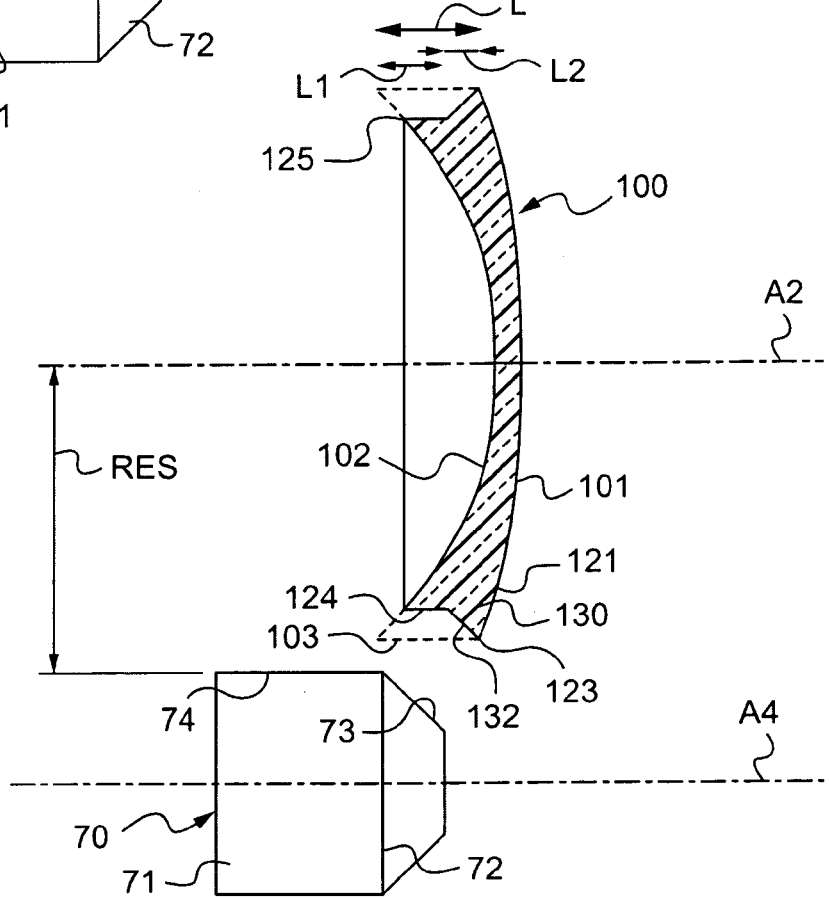

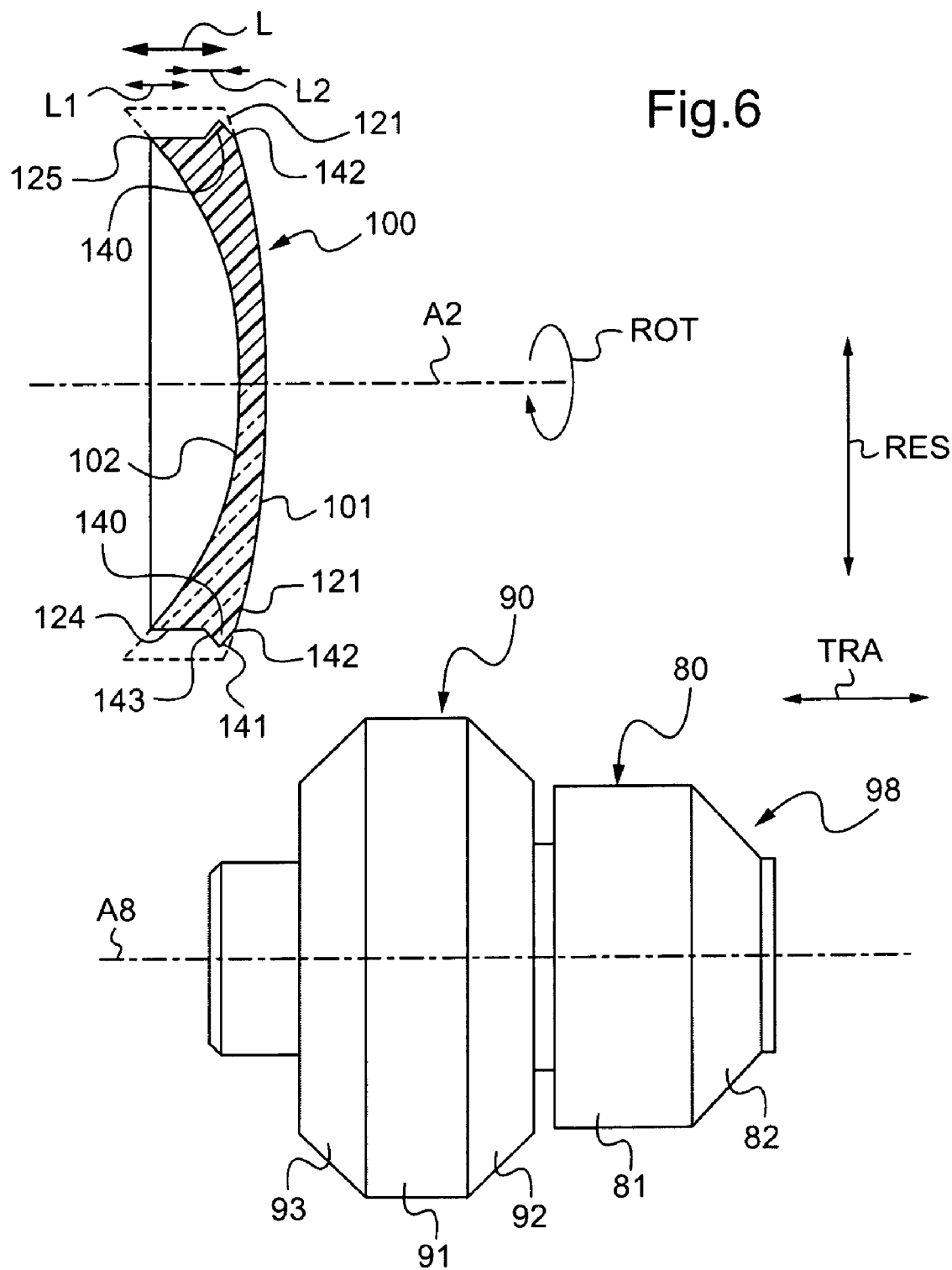

PAIR OF OPHTHALMIC EYEGLASSES AND A METHOD OF FORMING AN ENGAGEMENT PERIPHERAL RIDGE ON THE EDGE FACE OF A LENS

TECHNICAL FIELD TO WHICH THE INVENTION RELATES

The present invention relates in general to mounting ophthalmic lenses of a pair of ophthalmic eyeglasses in a frame, and it relates more particularly to engaging a lens in a surround of the frame of a pair of dark or correcting ophthalmic eyeglasses.

TECHNOLOGICAL BACKGROUND

As a general rule, a frame has rims each presenting an internal bezel forming a groove. The shaping of a lens in order to enable it to be mounted in the frame selected by the future wearer then consists in modifying the outline of the lens so as to match it to the frame.

With lenses for frames having rims, the shaping of the lens includes a final step referred to as beveling (or ridging) that consists in forming a ridge, commonly referred to as a bevel, that is generally of triangular cross-section on the edge face of the ophthalmic lens. The bevel is for engaging in the bezel formed in the rim or surround of the eyeglass frame in which the lens is to be mounted.

Conventionally, shaper means are constituted by a machine tool known as a grinder that possesses a set of main grindwheels together with means for blocking and driving the lens in rotation, which means are constituted by two rotary shafts on a common axis mounted to move axially relative to each other in order to clamp the lens on its axis between them.

In general, a roughing step is performed initially on the periphery of the lens by means of a cylindrical rouging grindwheel forming part of the set of grindwheels. During the roughing step, the lens is reduced approximately to the shape that it is desired to give to the lens. Thereafter, using a cylindrical finishing wheel of finer grain and provided with a V-shaped ridging groove, the finishing step is performed. The shape desired for the periphery of the lens is reached accurately and the bevel is formed by the ridging groove that imparts its shape to the edge face of the lens.

The shaped lens thus has a V-section bevel presenting two opposite conical flanks each extended to the corresponding front or rear face along the edge face of the lens by a cylindrical structure referred to as the foot of the bevel. Each foot on either side of the bevel is a substantially plane portion of the edge face of the lens that is situated beside the front or the rear flank of the bevel.

Nevertheless, when the lens is strongly cambered, it can be useful to encourage engagement of the bevel in the bezel of the corresponding rim by offsetting the height position of the feet of the bevel. To achieve such an offset in the height position of the feet of the bevel known as providing relief, it is necessary to provide a finishing grindwheel that presents a specific difference in diameter on either side of the ridging groove. When it is necessary to provide relief at different heights, it becomes necessary to provide a corresponding number of different finishing grindwheels.

Furthermore, for strongly cambered lenses that are beveled using a finishing grindwheel including a ridging groove, it is found that the bevel becomes partially pared away: it becomes thinner on the strongly cambered portions of the edge face of the lens. This thinning of the bevel degrades the quality and the accuracy with which the lens is mounted in the frame.

Finally, it can happen that the bevel engages in the bezel for the lens over only a fraction of the height of the bevel. In particular, the bottom portion of the flank of the bevel that faces towards the front of the lens is not covered by the rim of the frame. There thus exists a certain amount of space that remains visible between the rim of the frame end the front face of the lens, which is unattractive in appearance and tends to collect dirt.

OBJECT OF THE INVENTION

An object of the present invention is to solve at least one of the above-mentioned problems.

To this end, the invention provides a pair of ophthalmic eyeglasses comprising:
  a frame provided with at least one rim presenting an internal bezel; and
  a lens mounted in said frame, the lens presenting a front face, a rear face, and on its edge face, an engagement peripheral ridge presenting a rear flank, situated beside the rear face of the lens and a front flank situated beside the front face of the lens, the front and rear flanks being engaged in the internal bezel;
  wherein the front flank of the engagement peripheral ridge presents continuity of at least first order with the remainder of the front face, wherein the edge face of the lens presents a rear shoulder or foot, and wherein the radial height of the engagement peripheral ridge considered between the peak of said peripheral ridge and the foot varies along the periphery of the lens.

The term "continuity of first order" is used to mean that the ground peripheral portion of the front face of the lens presents an edge in common with the non-ground remainder of the front face. There is therefore no setback (or step) in the axial direction of the lens between the front face of the lens and the front flank of the engagement ridge. The front flank of the peripheral ridge is defined by the portion of the front face of the lens that is engaged in the bezel, and the front edge of the lens constitutes the peak of the engagement peripheral ridge that is engaged in the bezel. There is thus no ridge foot (or bevel foot) forming a step between the front face of the lens and the front flank of the engagement ridge.

As a result there is no visible space between the inside of the rim and the front face of the lens, and the rim of the frame is thus mounted flush with the front face of the lens. This improves the appearance of the mounting.

Furthermore, the absence of a ridge foot between the ridge and the front face enables the rear flank of the ridge to be machined using a tool that does not include a groove, while not machining the front flank of the ridge at all, or while machining it with a simple non-grooved chamfering tool or the equivalent. This serves to solve or significantly attenuate the problem of the ridge being pared away for lenses that are strongly curved, i.e. strongly cambered.

Finally, the problem of the height offset between the feet of the bevel (relief) is solved since it suffices merely to adjust the height (or more exactly the radius) of the rear foot of the ridge appropriately by correspondingly controlling the tool used for forming the flank and the rear foot of the engagement ridge. In particular, there is no longer any need to provide a plurality of grooved tools with different relief offsets.

The invention finds a particularly advantageous application when the front face of the lens can be inscribed in an approximating sphere having a radius of less than 12 centimeters (cm) (strongly cambered lens), and/or when the edge face of the shaped lens presents a thickness of at least 3 millimeters (mm).

According to a first advantageous characteristic of the invention, the lens presents a front face in which the peripheral portion does not present any edge of first-order or second-order discontinuity as a result of peripheral grinding. Since the front flank of the engagement peripheral ridge is formed by the front face of the lens, there is no longer any need for the front flank to be machined. This simplifies forming the engagement ridge. The mounting of the lens in a rim is then more attractive.

According to another advantageous characteristic of the invention, a peripheral portion of the front face of the lens is ground and is thus defined by an edge presenting discontinuity of second order. The term "discontinuity of second order" is used to mean a discontinuity of slope between the ground peripheral portion of the front face of the lens and the non-ground remainder of the front face. The front flank of the peripheral ridge thus presents a face of defined shape, typically conical shape, that is adapted to co-operation by accurate engagement with the bezel of the frame. While mounting the lens in the corresponding rim, the peripheral ridge of the lens is engaged in the bezel of the rim more accurately and more reliably. In addition, after mounting, the lens is advanced relative to the rim of the frame in which it is mounted, i.e. the lens is further away from the eye, thereby improving the appearance of the mounting.

The invention also provides a method of forming an engagement peripheral ridge on the edge face of a lens mounted to rotate about a first axis of rotation, the engagement peripheral ridge presenting a rear flank situated beside the rear face of the lens and a front flank situated beside the front face of the lens, wherein the method comprises:

a) manually or automatically selecting either a first machining tool provided with a ridging groove or a second machining tool presenting a first working face that is a surface of revolution about a second axis of rotation and that possesses a working generator line that is inclined at all instants during machining relative to the first axis of rotation; and b) the following conditional step:

if the first working tool is selected, forming the engagement peripheral ridge on the edge face of the lens with the front and rear flanks of the engagement peripheral ridge being machined on the edge face of the lens by reproducing the shape of the ridging groove; or if the second machining tool is selected, machining the edge face of the lens by means of the first working face of the second machining tool to form the rear flank of the engagement peripheral ridge, the front flank of the engagement peripheral ridge being formed on a peripheral portion of the front face of the lens and presenting continuity of at least first order with the remainder of the front face, without any machining of said peripheral portion or with machining of said peripheral portion causing an edge to appear presenting discontinuity of second order.

The method of the invention makes it possible to select between forming a conventional engagement ridge with both flanks being machined and with forming an engagement peripheral ridge that is flush with the front face, not having any ridge foot (or offset) between the front flank of the engagement ridge and the front face.

The fact that the second tool does not have a groove and the fact that the front flank of the ridge is not machined or is machined merely with a simple chamfering tool or the equivalent, likewise not having a groove, makes it possible to avoid performing machining with a replica shape, and serves to solve or significantly attenuate the problem of the ridge being pared away for lenses that are strongly curved, i.e. strongly cambered.

This also solves the problem of different height for the feet of the bevel (relief) since it then suffices to adjust appropriately the height (or more exactly the radius) of the rear foot of the ridge by correspondingly controlling the second tool for forming the flank and the rear foot of the engagement ridge. In particular, there is no longer any need to provide a plurality of grooved tools with different relief offsets.

Furthermore, the second tool that enables the method to be implemented may present a structure that is simple since only one inclined working face suffices for forming the rear flank of the peripheral ridge. This second tool can also be used for chamfering.

According to an advantageous characteristic of the invention, for the front face of the lens being inscribed in an approximating sphere, the second machining tool is selected if the radius of the sphere is less than 12 cm.

The paring-away of the peripheral ridge appears in particularly pronounced manner with lenses having a front face that possesses such camber. The use of the second machining tool enables the paring-away of the peripheral ridge to be limited.

According to an advantageous characteristic of the invention, the formation of the engagement peripheral ridge by means of the first machining tool is simulated numerically, and the second machining tool is selected if the numerical simulation reveals that the ridge is pared away from its set-point in at least one cross-section of the ridge, with said paring-away being greater than 10% of the area of the section.

In a first implementation, the edge face of the lens is machined over the entire width by the first working face. The rear flank of the peripheral ridge is thus formed by the edge face of the lens that is inclined relative to the axis of the lens. The peripheral ridge may thus be formed by means of a single inclined working face that machines the entire edge face of the lens on a slope, thereby simplifying formation of the peripheral ridge. It is then advantageous for the second machining tool to be a machining cutter or wheel with its first working face being cylindrical, the axis of rotation being inclined relative to the first axis of rotation for the lens.

In a second implementation, the second machining tool has a second working face forming a surface of revolution about the same axis as the first working face, the second machining tool being arranged relative to the lens in such a manner that, at all times during machining, the working generator line of said second working face is substantially parallel to the first axis of rotation for the lens, and in the event of the second machining tool being selected, the remaining portion of the width of the edge face of the lens is machined by the second working face so as to form a rear shoulder or foot for the engagement peripheral ridge of the lens, said rear foot presenting discontinuity of second order with the rear flank of the engagement peripheral ridge.

When only a portion of the width of the edge face is to be engaged in the bezel of the frame, it is possible to machine the other portion of the edge face situated beside the rear face of the lens in such a manner as to form a foot for the peripheral ridge.

In particular for thick lenses, machining this foot makes it possible to avoid removing too much material from beside the rear face of the lens in comparison with machining the entire edge face of the lens on a slope. Good appearance is thus conserved for the lens.

Furthermore, when the height of the foot that is to be made varies along the edge face of the lens relative to the peak of the ridge, it is possible to machine the portion of the edge face of the lens that is situated beside the rear face of the lens to different heights in order to form said foot.

Advantageously, this makes it possible to provide for the radial height of the peripheral engagement ridge, as measured between the peak of said peripheral ridge and the foot, to vary along the periphery of the lens.

According to another advantageous characteristic of the invention, the second machining tool is a machining tool in which the first working face is conical and the second working face is cylindrical, the second axis of rotation for the second machining tool being parallel to the first axis of rotation for the lens.

Such a machining tool is simple and can also serve to chamfer the lens.

In a third implementation, the second machining tool has a second working face forming a surface of revolution, the second machining tool being arranged relative to the lens in such a manner that the working generator line of said second working face is, at all times during machining, less inclined than the working generator line of the first working face relative to the first axis of rotation for the lens, and in the event of the second machining tool being selected, the remaining portion of the width of the edge face of the lens is machined by the second working face in such a manner as to form a rear foot of the engagement peripheral ridge of the lens, the rear foot presenting discontinuity of second order with the rear flank of the peripheral engagement ridge.

Advantageously, as in the second embodiment, it is then possible to provide for the radial height of the engagement peripheral ridge to be taken between the peak of said peripheral ridge and the foot varies along the periphery of the lens.

In execution variants:
the second machining tool is a machining wheel in which the first working face is conical and the second working face is cylindrical, and while machining at least a portion of the periphery of the lens, the second axis of rotation for the second machining tool being inclined relative to the first axis of rotation for the lens; and
the second machining tool is a machining cutter or wheel in which the first and second working faces are conical.

According to another advantageous characteristic of the invention, the diameter of the second machining tool is less than the diameter of the lens.

The use of a small-diameter tool for implementing the method of the invention makes it possible, when the lens presents a risk of the peripheral ridge being pared away, to form the peripheral ridge, while limiting the extent to which it is pared away.

According to another advantageous characteristic of the invention, the diameter of the second machining tool lies in the range 5 mm to 25 mm.

According to another advantageous characteristic of the invention, if the second machining tool is selected, then a third machining tool is also selected that possesses a third working face and the peripheral portion of the front face of the lens is machined by means of the third working face in such a manner that the machined peripheral portion of the front face of the lens forms the front flank of the engagement peripheral ridge.

According to another advantageous characteristic of the invention, the third machining tool is the same as the second machining tool.

DETAILED DESCRIPTION OF AN EMBODIMENT

The following description with reference to the accompanying drawings of an embodiment, given by way of non-limiting example, shows clearly what the invention consists in and how it can be reduced to practice.

In the accompanying drawings:

FIG. 2 is a side view of a lens and of a machining tool driven to form a peripheral ridge on the edge face of the lens in a first embodiment;

FIG. 3 is a side view of the lens and the machining tool driven to form a peripheral ridge on the edge face of the lens in a second embodiment;

FIG. 6 is a side view of the lens and another machining tool driven to machine the front flank of the peripheral ridge in a third embodiment.

Figure 1:
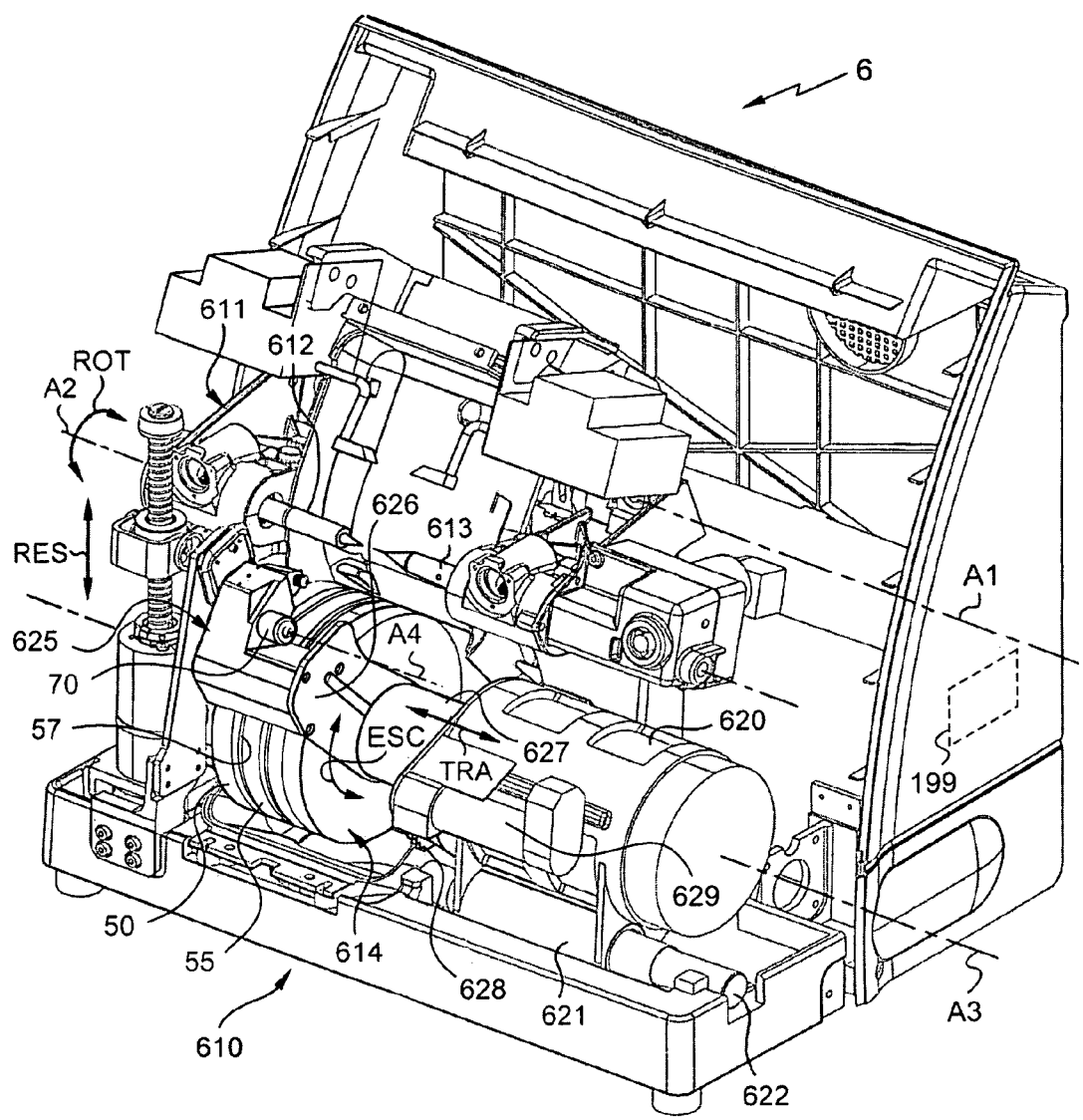
FIG. 1 is a perspective view of a shaper device.

Firstly it is recalled that an ophthalmic lens 100 possesses a convex front face 101 and a concave rear face 102, together with an edge face 103 and front and rear edges 123 and 125 at the junctions between the edge face 103 and the front and rear faces 101 and 102 (see FIGS. 2 and 3).

FIG. 1 shows a numerically controlled shaper device 6 adapted to modify the outline of the ophthalmic lens in order to fit it into the rim of a selected frame.

The device includes a rocker 611 that is mounted to pivot freely about a first axis A1, in practice a horizontal axis, on a frame. In order to drive an ophthalmic lens for machining in rotation, and in order to prevent it from moving, the rocker 611 is provided with support means suitable for clamping on the ophthalmic lens 100 and for driving it. These support means, or holder means, comprise two clamping and rotary drive shafts 612 and 613. These shafts 612 and 613 are in alignment with each other on a second axis A2, referred to as the blocking axis, and parallel to the first axis A1. The two shafts 612 and 613 are driven in rotation synchronously by a motor (not shown) via a common drive mechanism (not shown) on board the rocker 611.

Each of the shafts 612, 613 possesses a free end facing the other free end and designed to receive a blocking chuck (not shown) for blocking the lens on the shafts 612 or 613. The shaft 613 is movable in translation along the blocking axis A2 facing the other shaft 612 in order to clamp the lens in axial compression between the two blocking chucks.

The shaper device 6 includes a grinder 610 comprising a set of a plurality of grindwheels 614 mounted on a third axis A3 for roughing-out and finishing the edging of the ophthalmic lens 100 to be machined.

As shown diagrammatically in FIG. 1, the set of main grindwheels 614 comprises cylindrical grindwheels all possessing a diameter of about 155 mm. The set of main grindwheels 614 includes a roughing grindwheel 50. The roughing grindwheel has an edging face with planes in the roughing surface being of a size of about 150 micrometers.

Beside the roughing grindwheel 50, there is provided a finishing grindwheel 51 having an edging face provided with a ridging groove 57. The finishing grindwheel 55 possesses grains that are smaller, being about 55 micrometers in size in order to bring the outline of the blank accurately to the desired final outline, while forming a peripheral ridge that constitutes a bevel in the traditional meaning of this term for the person skilled in the art, i.e. the ridge having two machined flanks forming a V-shape, and each extended by a substantially plane portion referred to as the foot of the bevel. This peripheral ridge is designed to be engaged in the bezel of a rim of a frame.

The set of grindwheels is fitted on a common shaft of axis A3 serving to rotate them during an edging operation. The common shaft (not visible in the figures shown), is given in rotation by an electric motor 620.

The set of grindwheels 614 is also movable in translation along the axis A3 and is controlled in this movement in translation under motor control. Specifically, the set of grindwheels 614 together with its shaft and its motor is carried by a carriage 621 that is itself carried on slides 622 secured to the frame to slide along the third axis A3. The movement in translation of the grindwheel-carrier carriage 621 is referred to as transfer and is marked TRA in FIG. 1. This transfer is controlled by a motorized drive mechanism (not shown) such as a screw-and-nut system or a rack.

In order to enable the spacing between the axis A3 of the grindwheel 614 and the axis A2 of the lens to be adjusted dynamically during edging, use is made of the ability of the rocker 611 to pivot about the axis A1. This pivoting movement has the effect of causing the lens 100 gripped between the shafts 612 and 613 to move substantially vertically towards or away from the grindwheels 614. This freedom of movement serves to reproduce the desired edging or shape and is referred to as reproduction, being referenced RES.

The grinder 610 shown in FIG. 1 also includes a finishing module 625 provided with a finishing tool 70 for making a peripheral engagement ridge that acts as a bevel and/or a chamfer on the edge face of the lens 100 (see FIG. 1).

The machining tool 70 is a finishing wheel having a conical working face 72 and a cylindrical working face 71 both forming surfaces of revolution about the axis A4.

The axis of rotation A4 of the machining tool 70 in this example is substantially parallel to the axis of rotation A2 of the lens 100. Thus, at all times during machining, the working generator line 74 of the cylindrical working face 71 is substantially parallel to the axis of rotation A2 of the lens 100. The working generator line of a working face is defined as being the generator line of the working face that comes into contact with the edge face of the lens while the lens is being machined.

In FIG. 1 showing the shaper device 6, comparing the finishing wheel 70 with the set of grindwheels 614 shows that the diameter of the finishing wheel is much smaller than that of the grindwheels 50 and 55 of the set 614 of main grindwheels. The finishing wheel 70 has a maximum diameter of no more than 15% of the diameter of the finishing grindwheel 55. In this example, the diameter of the finishing wheel is 25 mm. In variants, the diameter of the finishing wheel may lie in the range 5 mm to 25 mm.

The conical shape of the working face 72 is such as to enable the rear face 102 of the lens 100 to be chamfered. In other words, at all times during machining, the point of intersection of the straight line representing the working generator line 73 of the working face 72 and the axis of the lens A2 lies, in the plane containing the axis A2 of the lens and the axis of rotation A4 of the finishing wheel 70, on the same side of the mean plane of the lens 100 as the center of curvature of the rear face 102 of said lens 100.

The working module 625 possesses a degree of freedom in movement in a direction that is substantially transverse relative to the axis A2 of the shafts 612 and 613 holding the lens and also the axis A5 for reproduction RES. This freedom of movement is referred to as retraction and is referenced ESC in the figures.

Specifically, this retraction consists in pivoting the finishing module 625 about the axis A3. Specifically, the module 625 is carried by a lever 626 secured to a tubular sleeve 627 mounted on the carriage 621 in order to pivot about the axis A3. In order to control its pivoting, the sleeve 627 is provided at its end remote from the lever 626 with a toothed wheel 628 that meshes with a gearwheel (not shown in the figures) fitted to the shaft of an electric motor 629 secured to the carriage 621.

The shaper device 6 includes a computer and electronic processor unit 119 for controlling the various members and constituted in this example by an electronics card designed to control the various freedoms in movement of the working tools and of the clamping and rotary drive means of the lens in coordinated manner in order to perform the automated shaping method that is described below.

By way of example, the computer and electronic system 199 comprises in conventional manner a motherboard, a microprocessor, a random access memory, and a permanent mass memory. The mass memory contains a program for executing the cycle for machining each lens to have a desired final outline. The mass memory is preferably rewritable and is advantageously removable so as to enable it to be replaced quickly or programmed on a remote computer via a standard interface. Means are also provided for storing the final outline desired for the lens, a user interface (e.g. a keyboard and a screen), means for communicating with another device whether local or remote, such as a centering appliance, an outline reader appliance or a microcomputer running software for assisting an optician or an optometrist.

In order to shape the lens 100 with the desired final outline, the reproduction movement RES of the rocker 611, the transfer movement TRA of the set of grindwheels 614, the retraction movement ESC of the finishing module 625, and the rotary movement ROT of the lens support shafts 613, 612 are driven in coordinated manner by the computer and electronic system 199 that is suitably programmed for this purpose so that all of the points on the outline of the lens 100 are brought in succession to the proper radius.

In this context, the general object of the invention is to incorporate in the grinder a function of finishing the shaping of the edge face 103 of the ophthalmic lens 100 that includes making an engagement peripheral ridge 120 of controlled shape.

The machining cycle that is performed begins with a step of roughing the shape of the lens. This roughing step consists in performing a plurality of machining passes with the roughing grindwheel 50 of the set of grindwheels 614 so as to obtain a blank with an outline that is of substantially the same shape as the desired final outline, but of slightly greater size. The rouging grindwheel 50 possesses a large grain size enabling a large quantity of lens material to be removed quickly. During this roughing step, the edge face 103 of the lens 100 is machined flat so that the edge face is cylindrical, without any peripheral ridge.

Thereafter, the edging finishing step is performed. Either the beveled finishing grindwheel 55 or the finishing wheel 70 is selected, either automatically or by manual input. The finishing wheel 70 is selected in particular under the following circumstances.

The finishing wheel 70 is selected when there is a risk of the bottom portion of the front flank of the peripheral ridge, were it to be made by the beveled finishing grindwheel 55, not being covered by the lens bezel. In other words, when there exists a risk once the lens has been mounted in the corresponding rim, that a visible space will remain between the front flank of the peripheral ridge and the front face of the lens.

The finishing wheel is also selected when the lens 100 presents a risk of paring away the peripheral ridge that is to be made. There exists a risk of paring if at least one of the following two conditions is satisfied.

In a first condition, the computer and electronic system 199 determines the mathematical sphere in which the front face 101 of the lens 100 can be inscribed. The finishing wheel 70 is selected if the radius of the sphere is less than 12 cm and preferably less than or equal to 8 cm. Such a lens is referred to as a strongly-curved lens and presents a risk of the peripheral ridge being pared away by the beveled finishing grindwheel 55 (as is usually used). In a second condition, the computer and electronic system 199 performs numerical simulation of the formation of the engagement peripheral ridge by means of the beveled finishing grindwheel 55. The computer and electronic system 199 then determines the amount of paring away of the future peripheral ridge 120 results from interference with the beveled finishing grindwheel 55. The finishing wheel 70 is selected if the numerical simulation discovers that, in at least one of its cross-sections, the ridge is pared away by more than 10%.

Thus, in at least one of the two above-mentioned conditions, the electronic processor unit 199 operates the shaper device by selecting the finishing wheel 70 and then forming the peripheral ridge on the edge face of the lens with said finishing wheel 70, in the manner described below.

In a first implementation shown in FIG. 2, the periphery of the rear face 102 of the lens is chamfered.

For this purpose, the electronic processor system 199 is programmed to drive the freedoms of movement in transfer TRA of the working module 625 carrying the finishing wheel 70, in reproduction RES of the clamping and rotary drive shafts 612 and 613, in retraction ESC of the working module 625, and in rotation ROT of the lens in coordination suitable for positioning the conical working face 72 of the finishing wheel 70 in register with the edge face 103 of the lens.

The finishing wheel 70 is then moved relative to the lens 100 so that the edge face 103 of the lens 100 is machined on a slope relative to the axis of rotation A4 of the lens.

The edge face 103 of the lens 100 is machined over its entire width L by the working generator line 73 of the conical working face 72. The chamfering of the periphery of the rear face 102 of the lens as performed in this way forms the rear flank 122 of the peripheral ridge 120 and the peripheral portion 121 of the front face 101 forms the front flank 121 of said peripheral ridge 120. The front edge 123 forms the peak 123 of the peripheral ridge 120.

Thus, the peripheral portion 121 of the front face 101 of the lens does not include any facets. In other words, the peripheral portion 121 of the front face of the lens does not present any second-order discontinuity, i.e. any discontinuity in the slope of its surface. Naturally, the lens may include a near-vision segment; but such a segment does not affect the periphery of the lens and is not considered here as being a facet.

Figure 4:
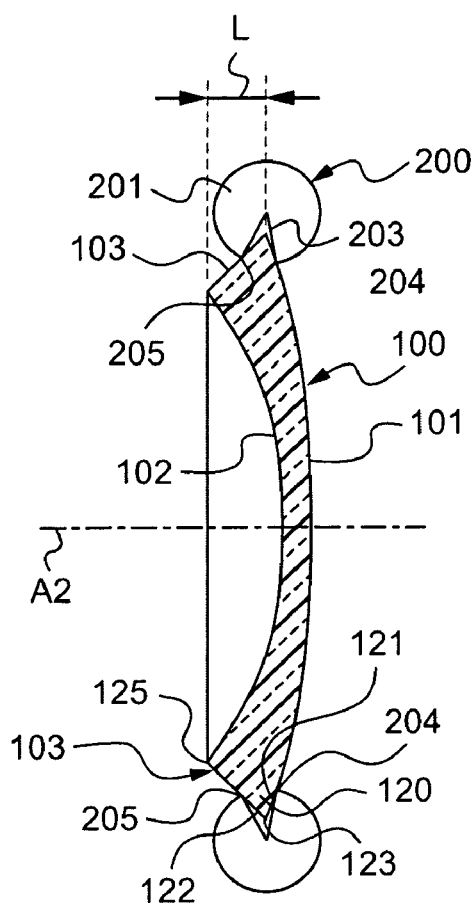
FIG. 4 is a view of the FIG. 2 lens mounted in a rim an eyeglass frame.

As shown in FIG. 4, the lens 100 is mounted in a rim 201 of a frame 200 by mutual engagement or snap-fastening. For this purpose, the rim 201 includes a bezel 203 presenting front and rear edges 204 and 205 that bear respectively against the front and rear flanks 121 and 122 of the engagement peripheral ridge 120.

The edge face of the lens 100 is machined to have inclination that is sufficient to obtain an angle at the peak 123 of the peripheral ridge 120 that is sufficiently acute to ensure that the peripheral ridge 120 as formed in this way can be engaged in the bezel 203.

In a second embodiment (FIG. 3), which is preferably applied to thick lenses, only a front portion L2 of the width L of the edge face of the lens is machined with the conical working face 72 of the finishing wheel 70. This machined portion L2 of the width L of the edge face is the portion situated beside the front face 101 of the lens.

The machining of this portion L2 of the width L of the edge face by means of the conical working face 72 serves to form a rear flank 132 of a peripheral ridge 130.

The remaining portion L1 of the width L of the edge face 103 of the lens 100 is machined by the cylindrical working face 71 so as to form a rear foot 124 for the peripheral ridge 130 of the lens 100.

For this purpose, the movement of the finishing wheel 70 is driven in such a manner that firstly the cylindrical working face 71 of the finishing wheel 70 is put into contact with the remaining portion L1 of the width L of the edge face 103 of the lens, and that secondly the conical working face 72 of the finishing wheel 70 is put into contact with the portion L2 of the width L of the edge face 103 of the lens.

The edge face 103 of the lens 100 thus presents a line of second-order discontinuity 129 in its width L such that the portion L1 of the width of the edge face 103 situated between the rear face 102 and the discontinuity forms the rear foot 124 of the peripheral ridge 130, and the remaining portion L2 of its width L forms the rear flank 132 of the peripheral ridge 130.

Figure 5:
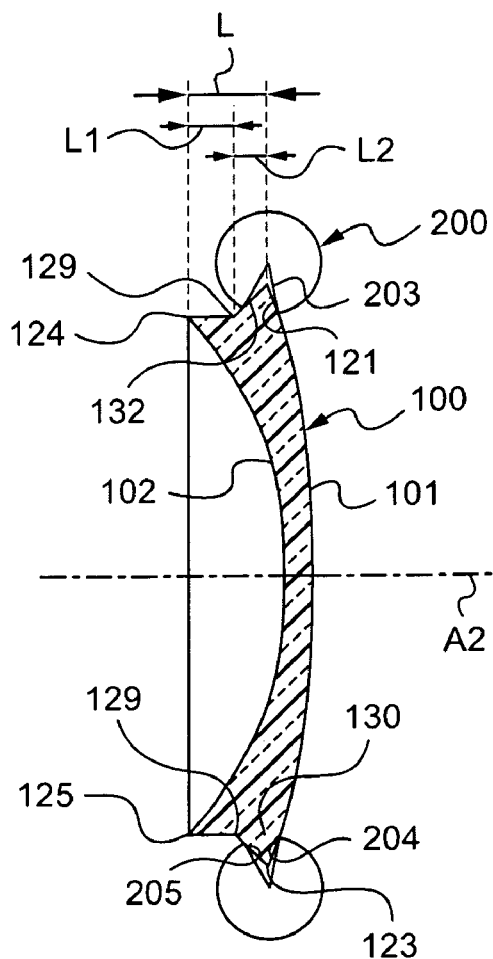
FIG. 5 is a view of the FIG. 3 lens mounted in a rim of an eyeglass frame.

As shown in FIG. 5, and in a manner similar to the first embodiment, when the lens 100 is mounted in the rim 201 of the frame 100, the front and rear edges 204 and 205 of the bezel 203 bear respectively against the front and rear flanks 121 and 131 of the engagement peripheral ridge 130.

This solution is mainly for appearance purposes and it seeks to avoid removing too much material from the portion of the edge face of the lens that faces towards the rear face of the lens. In particular for a thick lens, this retains good appearance for the lens.

The finishing wheel is also selected for implementing this second embodiment shown in FIGS. 3 and 5 when it is desired to machine the rear foot 124 of the peripheral ridge 130 at different heights relative to the peak 123 of the ridge, i.e. in this example the front edge 123 of the lens. The finishing wheel is then driven during the machining operation so that the radial height of the peripheral ridge 130, i.e. the distance in a radial direction of the lens between the peak of the peripheral ridge 130 and the foot 124 varies along the periphery of the lens, and thus as a function of the angle of rotation of the lens.

The variation in the height of the rear foot of the peripheral ridge is adapted to the configuration of the bezel. In particular, the variation in the height of the rear foot enables to take account of the twisting or skew of the bezel that generates a height offset between its portions bearing against the flanks of the engagement ridge. This makes mounting of the ridge in the bezel more reliable and gives it better appearance.

More precisely, this height of the ridge is given by a somewhat non-uniform function of the position of the axial section plane taken in consideration along the edge face of the lens. The ridge 130 is machined to comply with axial and radial shape setpoints that act, as a function of the position of the axial section plane under consideration of the lens, to give respectively the axial and radial positions of a directing longitudinal curve traced on this engagement ridge in this axial section. The function giving the height of the ridge 130 incorporates at least one of the radial and axial setpoints for the shape of the directing longitudinal curve in the axial section under consideration (i.e. being machined) along the periphery of the lens.

The function giving the height of the ridge 130 includes a parameter that is characteristic of the overall shape of one of the optical faces of the lens or of a longitudinal curve of the bezel in the rim of the frame. By way of example, this parameter may consist in a radius for a spherical base approximating the shape of the lens or a longitudinal curve of the bezel in the rim of the frame.

The function giving the height of the ridge 130 also includes a parameter that is deduced from the radial and axial shape setpoints for the directing longitudinal curve of the engagement ridge 130.

The function giving the height of the ridge 130 also includes a parameter that depends on the shape of the profile of the bezel in the rim of the frame as acquired by feeling the bezel with or without making contact and in at least one cross-section of the rim.

The present invention is not limited in any way to the embodiments described and shown, and the person skilled in the art can apply any variant within the spirit of the invention.

In a variant, in both the first and the second embodiment, it is possible to incline the axis A4 of the finishing wheel 70 so as to modify the angle at the peak of the peripheral ridge.

The finishing grindwheel 55 of the set 614 of main grindwheels is used to perform finishing on other types of ophthalmic lens by machining the front and rear flanks of the engagement peripheral ridge on the edge face of the lens by using the ridging groove 57.

In a variant of the second embodiment, provision can be made to incline the axis of rotation of the machining tool so that the cylindrical face of the machining tool can chamfer the rear edge of the lens. It is possible to machine the chamfer of the lens in such a manner that the inclination of the chamfer of the lens is adapted to the camber of the lens in such a manner as to facilitate retention of the lens in the rim of the frame.

Provision can be made for the inclination of the machining tool to be fixed, in which case a mean angle is selected that is appropriate for most lenses, or else provision can be made for the finishing module to be designed in such a manner as to enable the angle of inclination of the axis of rotation of the machining tool to be controlled.

In a variant of the second embodiment, the machining tool used for the foot of the peripheral ridge may be distinct and different from the machining tool serving to machine the rear flank of the peripheral ridge.

In a variant of the first embodiment, the machining tool may be a machining cutter or wheel having a working face that is entirely cylindrical. The machining tool is then arranged with the finishing module in such a manner that its axis of rotation is inclined relative to the axis of the lens.

Thus, working generator line of the working face of the machining tool is inclined relative to the generator line of the edge face of the lens. The movement of the machining tool is then controlled in such a manner as to machine the edge face of the lens completely in order to make the rear flank of the peripheral ridge.

There follows a description with reference to FIG. 6 of a third embodiment that can be combined with the first (FIGS. 2 and 4) and with the second (FIGS. 3 and 5) embodiments as described above.

In this third embodiment, and as shown in FIG. 6, provision is made to add a set of tools 98 that is mounted on the finishing module 625. This set of tools 98 includes a finishing wheel 80 and a polishing wheel 90. These two wheels are mounted on a common rotary drive shaft (not shown) of axis A8.

The finishing wheel 80 has a cylindrical working face 81 and a conical working face 82 with the normal to a point of said face being directed away from the center of curvature of the lens 100. The conical and cylindrical working faces 82 and 81 of the rigid finishing wheel 80 are used in the same manner as the corresponding working faces of the wheel 70 provided in the first and second embodiments (FIGS. 1 to 5) in order to form the rear flank 143 and/or the rear foot 124 of an engagement peripheral ridge 140.

The polishing wheel 90 has a central cylindrical working face and, on either side of the cylindrical working face 91, two oppositely-directed conical working faces 92 and 93. The conical working faces 92 and 93 of this polishing wheel are used for making polished chamfers on the edges of the front and rear faces of the lens, and the central cylindrical working face 91 serves to polish the rear foot 124 extending parallel to the axis A8 between the rear flank 143 and the rear face 102. The normal to a point of the conical working face 93 is directed towards the center of curvature of the lens 100. This conical working face 93 is thus appropriately oriented for machining the front face 101 of the lens.

In this third embodiment, the rear foot 124 and the rear flank 143 are machined as described above, and, in addition, the peripheral portions 121 of the front face 101 of the lens is machined by the conical working face 93 of the polishing wheel 90 so as to present a facet 141 that is inclined and that forms the front flank 141 of the peripheral ridge 140.

The freedoms of the lens to move in reproduction RES and in rotation ROT, and also the freedom of the polishing wheel 90 to move in transfer TRA are controlled together so as to machine the peripheral portion 121 of the lens and thus form the machined front flank 141 of the peripheral ridge 140. This forms a second-order discontinuity 142 on the peripheral portion 121 of the front face 101 of the lens.

When the lens is mounted in the corresponding rim, the peripheral ridge of the lens is engaged in the bezel of the rim in a manner that is more reliable and precise. The conical front flank 141 of the peripheral ridge 140 is adapted to make contact appropriately with the bezel. In addition, by virtue of the peripheral portion of the front face of the lens being machined in this way, the lens is advanced relative to the corresponding rim in which it is mounted, i.e. the lens is further away from the eye, thereby making the mounting more attractive.

In a variant, provision can be made for the shaft on which the two wheels 80 and 90 are mounted also to possess freedom of movement in pivoting about an axis extending transversely to the vertical plane containing the axis A2 of the lens, i.e. the plane of FIG. 6. This freedom to move in pivoting can be controlled in such a manner as to obtain the inclination desired for the front flank 141 of the peripheral ridge.

The invention claimed is:

1. A method of forming an engagement peripheral ridge (120; 130) on the edge face (103) of a lens (100) mounted to rotate about a first axis of rotation (A2), the engagement peripheral ridge (120; 130) presenting a rear flank (122; 132) situated beside the rear face (102) of the lens (100) and a front flank (121) situated beside the front face (101) of the lens, the method being characterized in that it comprises:

a) manually or automatically selecting either a first machining tool (55) provided with a ridging groove (57) or a second machining tool (70) presenting a first working face (72) that is a surface of revolution about a second axis of rotation (A4) and that possesses a working generator line (73) that is inclined at all instants during machining relative to the first axis of rotation (A2); and b) the following conditional step:

if the first machining tool (55) is selected, forming the engagement peripheral ridge on the edge face of the lens with the front and rear flanks of the engagement peripheral ridge being machined on the edge face of the lens by reproducing the shape of the ridging groove (75); or if the second machining tool (70) is selected, machining the edge face (103) of the lens (100) by means of the first working face (72) of the second machining tool (70) to form the rear flank (122; 132) of the engagement peripheral ridge (120; 130), the front flank (121) of the engagement peripheral ridge (120; 130) being formed on a peripheral portion (121) of the front face (101) of the lens and presenting continuity of at least first order with the remainder of the front face, without any machining of said peripheral portion or with machining of said peripheral portion causing an edge (142) to appear presenting discontinuity of second order.

2. A method according to claim 1, wherein, for the front face (101) of the lens (100) being inscribed in an approximating sphere, the second machining tool (70) is selected if the radius of the sphere is less than 12 cm.

3. A method according to claim 1, wherein the formation of the engagement peripheral ridge by means of the first machining tool (55) is simulated numerically, and the second machining tool (70) is selected if the numerical simulation reveals that the ridge is pared away from its setpoint in at least one cross-section of the ridge, with said paring-away being greater than 10% of the area of the section.

4. A method according to claim 1, wherein the edge face (103) of the lens (100) is machined over the entire width (L) by the first working face (72).

5. A method according to claim 4, wherein the second machining tool is a machining cutter or wheel with its first working face being cylindrical, the axis of rotation being inclined relative to the first axis of rotation for the lens.

6. A method according to claim 1, wherein the second machining tool (70) has a second working face (71) forming a surface of revolution about the same axis as the first working face (72), the second machining tool (70) being arranged relative to the lens (100) in such a manner that, at all times during machining, the working generator line (74) of said second working face (71) is substantially parallel to the first axis of rotation (A2) for the lens (100), and in that in the event of the second machining tool (70) being selected, the remaining portion (L1) of the width (L) of the edge face (103) of the lens (100) is machined by the second working face (71) so as to form a rear shoulder or foot (124) for the engagement peripheral ridge (130) of the lens (100), said rear foot (124) presenting discontinuity of second order with the rear flank (132) of the engagement peripheral ridge (130).

7. A method according to claim 6, wherein the radial height of the engagement peripheral ridge (120; 130) considered between the peak of said peripheral ridge and the foot (124) varies along the periphery of the lens.

8. A method according to claim 6, wherein the second machining tool (70) is a machining tool in which the first working face (72) is conical and the second working face (71) is cylindrical, the second axis of rotation (A4) for the second machining tool (70) being parallel to the first axis of rotation (A2) for the lens (100).

9. A method according to claim 1, wherein the second machining tool (70) has a second working face (71) forming a surface of revolution, the second machining tool (72) being arranged relative to the lens (100) in such a manner that the working generator line (74) of said second working face (71) is, at all times during machining, less inclined than the working generator line (73) of the first working face (72) relative to the first axis of rotation (A2) for the lens (100), and in that in the event of the second machining tool (70) being selected, the remaining portion (L1) of the width (L) of the edge face (103) of the lens (100) is machined by the second working face (71) in such a manner as to form a rear foot (124) of the engagement peripheral ridge (130) of the lens (100).

10. A method according to claim 9, wherein the radial height of the engagement peripheral ridge (120; 130) taken between the peak of said peripheral ridge and the foot (124) varies along the periphery of the lens.

11. A method according to claim 9, wherein the second machining tool (70) is a machining wheel in which the first working face (72) is conical and the second working face (71) is cylindrical, and while machining at least a portion of the periphery of the lens, the second axis of rotation (A4) for the second machining tool (70) being inclined relative to the first axis of rotation (A2) for the lens (100).

12. A method according to claim 9, wherein the second machining tool is a machining cutter or wheel in which the first and second working faces are conical.

13. A method according to claim 1, wherein the diameter of the second machining tool (70) is less than the diameter of the lens (100).

14. A method according to claim 1, wherein the diameter of the second machining tool (70) lies in the range 5 mm to 25 mm.

15. A method according to claim 1, wherein, if the second machining tool (70) is selected, then a third machining tool (90) is also selected that possesses a third working face (93) and the peripheral portion (121) of the front face (101) of the lens is machined by means of the third working face (93) in such a manner that the machined peripheral portion (121) of the front face (101) of the lens (100) forms the front flank (141) of the engagement peripheral ridge.

16. A method according to claim 15, wherein the third machining tool is the same as the second machining tool.

* * * * *